(12) United States Patent
Kai

(10) Patent No.: US 11,351,981 B2
(45) Date of Patent: Jun. 7, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventor: Ayaka Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 655 days.

(21) Appl. No.: 16/232,223

(22) Filed: Dec. 26, 2018

(65) Prior Publication Data

US 2019/0217850 A1    Jul. 18, 2019

(30) Foreign Application Priority Data

Jan. 12, 2018    (JP) .............................. JP2018-003193

(51) Int. Cl.
    *B60W 20/13*    (2016.01)
    *B60W 20/12*    (2016.01)
    (Continued)

(52) U.S. Cl.
    CPC .............. *B60W 20/13* (2016.01); *B60K 6/20* (2013.01); *B60W 10/06* (2013.01); *B60W 10/08* (2013.01); *B60W 10/26* (2013.01); *B60W 20/12* (2016.01); *B60W 2400/00* (2013.01); *B60W 2510/244* (2013.01); *B60W 2710/06* (2013.01); *B60W 2710/08* (2013.01); *B60W 2710/244* (2013.01);
    (Continued)

(58) Field of Classification Search
None
See application file for complete search history.

(56) References Cited

U.S. PATENT DOCUMENTS

| 2012/0179315 A1* | 7/2012 | Tate, Jr. | .............. B60L 15/2045 |
| | | | 903/930 |
| 2013/0179007 A1* | 7/2013 | Dalum | .................... B60L 1/006 |
| | | | 701/2 |
| 2020/0164859 A1* | 5/2020 | Books | ................... B60W 10/06 |

FOREIGN PATENT DOCUMENTS

| CN | 101522494 | 9/2009 |
| CN | 103308053 | 9/2013 |
| | (Continued) | |

OTHER PUBLICATIONS

Chinese Office Action for Chinese Patent Application No. 201811553104.X dated Oct. 25, 2021.
(Continued)

*Primary Examiner* — Lail A Kleinman
(74) *Attorney, Agent, or Firm* — Amin, Turocy & Watson, LLP

(57) ABSTRACT

A vehicle control system according to this embodiment includes: a storage battery that stores a electric power generated by a power generating unit or electric power supplied by a charging spot; a use status acquiring unit that acquires a use status of a charging spot present in an area identified by a route from a place of departure to a destination of the vehicle; and a control unit that sets a charging target value of the storage battery at the time of arrival of the vehicle at a destination to be higher in a case in which a status is determined in which the charging spot is unusable than a case in which a status is determined in which the charging spot is usable on the basis of the use status of the charging spot acquired by the use status acquiring unit.

5 Claims, 7 Drawing Sheets

(51) Int. Cl.
*B60W 10/08* (2006.01)
*B60W 10/06* (2006.01)
*B60W 10/26* (2006.01)
*B60K 6/20* (2007.10)

(52) U.S. Cl.
CPC ....... *B60Y 2300/60* (2013.01); *B60Y 2300/91* (2013.01)

(56) References Cited

FOREIGN PATENT DOCUMENTS

| | | |
|---|---|---|
| CN | 103339005 | 10/2013 |
| JP | 2008-100645 | 5/2008 |
| JP | 2008-249503 | 10/2008 |
| JP | 2010-230615 | 10/2010 |
| JP | 2013-148412 | 8/2013 |
| JP | 2015-230719 | 12/2015 |
| JP | 2016-088334 | 5/2016 |
| WO | 2015/118781 | 8/2015 |

OTHER PUBLICATIONS

Japanese Office Action for Japanese Patent Application No. 2018-003193 dated Sep. 21, 2021.

* cited by examiner

| CHARGING SPOT IDENTIFICATION ID | INSTALLATION POSITION | DATE AND TIME INFORMATION | OPERATION RATIO | NUMBER OF RESERVED VEHICLES | MALFUNCTION FLAG |
|---|---|---|---|---|---|
| C001 | (X1, Y1) | YYYY/MM/DD hh:mm:ss | 30% | 1 | 0 |
| C002 | (X2, Y2) | YYYY/MM/DD hh:mm:ss | 90% | 5 | 0 |
| C003 | (X3, Y3) | YYYY/MM/DD hh:mm:ss | 0% | 0 | 1 |
| ... | ... | ... | ... | ... | ... |

| 366 | ROAD ID | DEGREE OF CONGESTION |
|---|---|---|
| | R001 | *** |
| | R002 | *** |
| | R003 | *** |
| | ... | ... |

| 368 | REGION ID | WEATHER |
|---|---|---|
| | A001 | SUNNY |
| | A002 | RAIN |
| | A003 | CLOUDY |
| | ... | ... |

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2018-003193, filed Jan. 12, 2018, the content of which is incorporated herein by reference.

BACKGROUND OF THE INVENTION

Field of the Invention

The present invention relates to a vehicle control system, a vehicle control method, and a storage medium.

Description of Related Art

Conventionally, hybrid vehicles in which a storage battery and an internal combustion engine outputting power for generating electric power are mounted are widely used. In relation to this, technologies for predicting a time at which a vehicle arrives at a desired charging stand on the basis of the latest traffic information and making a reservation for a charging place at a predicted arrival time have been disclosed (for example, see Japanese Unexamined Patent Application, First Publication No. 2010-230615).

SUMMARY OF THE INVENTION

However, in a conventional technology, generating a power generation plan for a round trip between a place of departure and a destination of the basis of a result of determination on whether or not a vehicle can actually be charged at a desired charging station has not been considered. As a result, in a case in which charging cannot be performed at a desired charging stand, there is a possibility of a vehicle occupant feeling stressed due to anxiety about power deficiency on a returning route.

An aspect of the present invention is in consideration of such situations, and one object thereof is to provide a vehicle control system, a vehicle control method, and a storage medium capable of reducing a vehicle occupant's anxiety about power deficiency.

A vehicle control system, a vehicle control method, and a storage medium according to the present invention employ the following configurations.

(1): A vehicle control system according to one aspect of the present invention is a vehicle control system including: a power generating unit that includes an internal combustion engine outputting power used by an electric motor and the electric motor generating electric power using the power output by the internal combustion engine; a storage battery that stores the electric power generated by the power generating unit or electric power supplied by a charging spot; a running electric motor that is connected to driving wheels of a vehicle and is driven using the electric power supplied from the storage battery to rotate the driving wheels; a use status acquiring unit that acquires a use status of a charging spot present in an area identified by a route from a place of departure to a destination of the vehicle; and a control unit that sets a charging target value of the storage battery at the time of arrival of the vehicle at a destination to be higher in a case in which a status is determined in which the charging spot is unusable than a case in which a status is determined in which the charging spot is usable on the basis of the use status of the charging spot acquired by the use status acquiring unit.

(2) In the aspect (1) described above, the charging spot is present at the destination.

(3) In the aspect (1) described above, the control unit sets an operation rate of the power generating unit to be higher in a forward path from the place of departure to the destination than in a return path from the destination to the place of departure in a case in which the status is determined in which the charging spot is unusable.

(4) In the aspect (1) described above, the control unit executes control such that the charging rate of the storage battery is equal to or higher than a first threshold in the forward path from the place of departure to the destination.

(5) A vehicle control method according to one aspect of the present invention is a vehicle control method using an in-vehicle computer of a vehicle including a power generating unit that includes an internal combustion engine outputting power used by an electric motor and the electric motor generating electric power using the power output by the internal combustion engine, a storage battery that stores the electric power generated by the power generating unit or electric power supplied by a charging spot, and a running electric motor that is connected to driving wheels of the vehicle and is driven using the electric power supplied from the storage battery to rotate the driving wheels. The vehicle control method includes: acquiring a use status of a charging spot present in an area identified by a route from a place of departure to a destination of the vehicle; and setting a charging target value of the storage battery at the time of arrival of the vehicle at a destination to be higher in a case in which a status is determined in which the charging spot is unusable than in a case in which a status is determined in which the charging spot is usable on the basis of the acquired use status of the charging spot.

(6): A storage medium according to one aspect of the present invention is a computer-readable non-transitory storage medium having a program stored thereon, the program causing an in-vehicle computer of a vehicle including a power generating unit that includes an internal combustion engine outputting power used by an electric motor and the electric motor generating electric power using the power output by the internal combustion engine, a storage battery that stores the electric power generated by the power generating unit or electric power supplied by a charging spot, and a running electric motor that is connected to driving wheels of the vehicle and is driven using the electric power supplied from the storage battery to rotate the driving wheels to execute: acquiring a use status of a charging spot present in an area identified by a route from a place of departure to a destination of the vehicle; and setting a charging target value of the storage battery at the time of arrival of the vehicle at a destination to be higher in a case in which a status is determined in which the charging spot is unusable than a case in which a status is determined in which the charging spot is usable on the basis of the acquired use status of the charging spot.

According to the aspects (1) to (6) described above, vehicle occupant's anxiety about power deficiency can be reduced.

BRIEF DESCRIPTION OF THE DRAWINGS

FIG. 3 is a diagram showing one example of a content of a use status table;

DETAILED DESCRIPTION OF THE INVENTION

Hereinafter, a vehicle control system, a vehicle control method, and a storage medium according to embodiments will be described with reference to the drawings.

[Entire Configuration]

Figure 1:
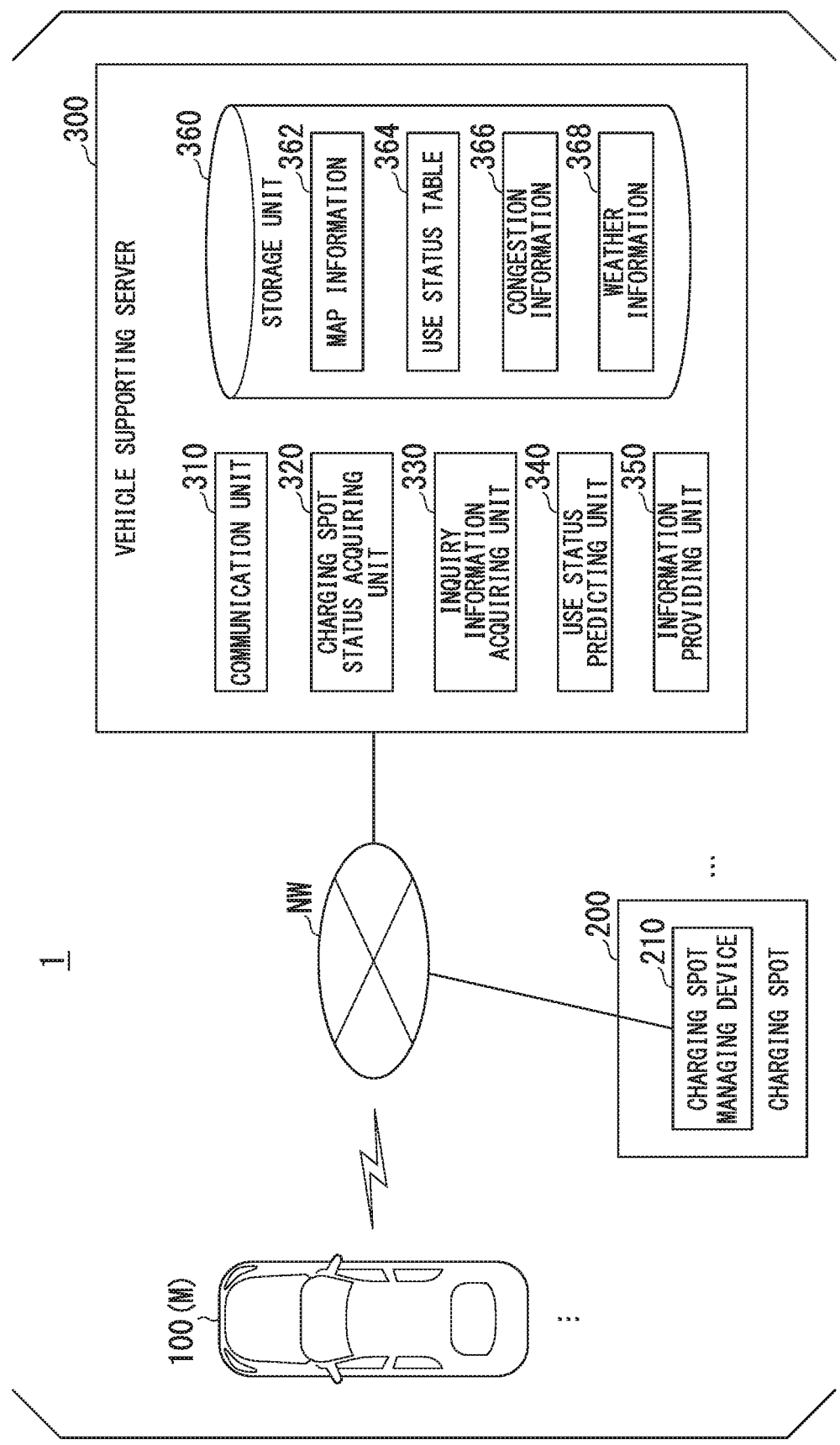
FIG. 1 is a configuration diagram of a vehicle supporting system according to an embodiment.

FIG. 1 is a configuration diagram of a vehicle supporting system 1 according to an embodiment. The vehicle supporting system 1 includes one or more vehicles 100, one or more charging spots 200, and a vehicle supporting server 300. Such constituent elements can communicate with each other through a network NW. The network NW includes the Internet, a wide area network (WAN), a local area network (LAN), a public line, a provider apparatus, a dedicated line, a radio base station, and the like. The charging spot 200 is, for example, a spot at which one or more facilities that are able to charge a storage battery mounted in the vehicle 100 are installed (chargeable spot).

[Vehicle]

The vehicle 100, for example, may be a vehicle having two wheels, three wheels, four wheels, or the like, and a driving source thereof may be an internal combustion engine such as a diesel engine or a gasoline engine, an electric motor, or a combination thereof. In a case in which an electric motor is included, the electric motor operates using electric power generated using an electric motor connected to an internal combustion engine or power discharged from a secondary cell or a fuel cell. In the following description, a hybrid vehicle employing a series system will be described as an example. The series system is a system in which an engine and driving wheels are not mechanically connected, the power of the engine is used for power generation using a power generator, and generated electric power is supplied to an electric motor for driving. The subject vehicle M may be a vehicle capable of plug-in charging a battery. Hereinafter, in a case in which a vehicle is to be described separated from the other vehicles among one or more vehicles 100 included in the vehicle supporting system 1, it will be referred to as a "subject vehicle M". In the following description, it is assumed that the vehicle 100 mainly runs using electric power supplied from a battery. It is assumed that the charging of the battery is performed using an external device such as a charging stand, and charging using an engine or an electric motor is supplementarily performed.

Figure 2:
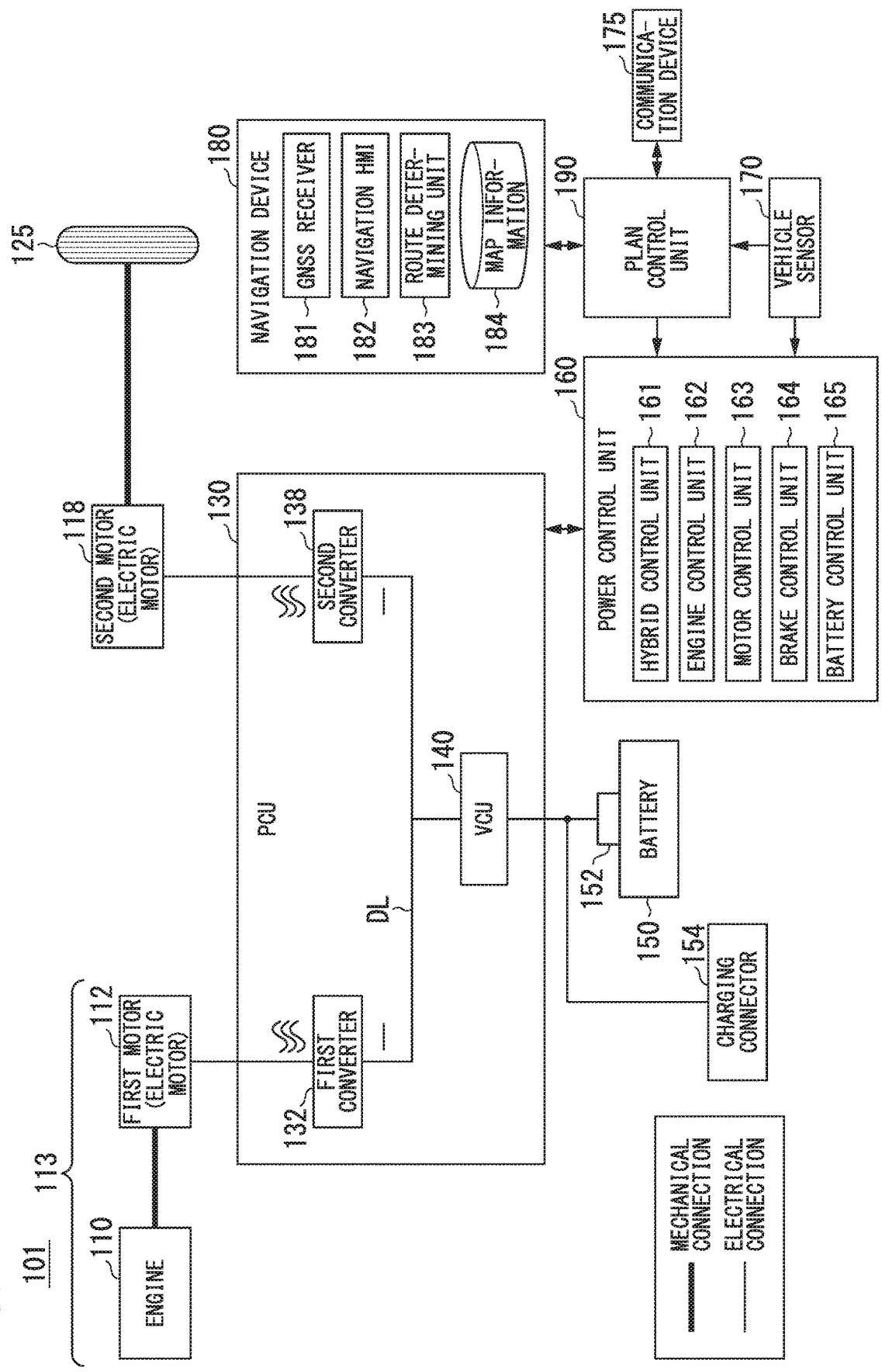
FIG. 2 is a diagram showing one example of the configuration of a vehicle in which a vehicle system is mounted.

FIG. 2 is a diagram showing one example of the configuration of the vehicle 100 in which a vehicle system 101 is mounted. In the vehicle 100 in which the vehicle system (one example of a vehicle control system) 101 is mounted, for example, an engine 110, a first motor (electric motor) 112, a second motor (electric motor) 118, driving wheels 125, a power control unit (PCU) 130, a battery (storage battery) 150, a power control unit 160, a vehicle sensor 170, a communication device 175, a navigation device 180, and a plan control unit 190 are mounted. A combination of the power control unit 160 and the plan control unit 190 is one example of a "control unit".

The engine 110 is an internal combustion engine that outputs power by combusting fuel such as gasoline. The engine 110, for example, is a reciprocating engine including a cylinder and a piston, an intake valve, an exhaust valve, a fuel injection device, an injection plug, a connecting rod, a crank shaft, and the like. The engine 110, for example, is a four-cycle engine, but any other cycling method may be used. As the engine 110, any kind of engine such as a diesel engine, a gas turbine engine, a rotary engine, or an external combustion engine that generates power may be used. The power that can be output by the engine 110 is power that is lower than power required for generating an amount of electric power used for the first motor 112 to drive the second motor 118 in real time (or an amount of electric power enabling the vehicle 100 to run at a predetermined speed or more). Since the engine 110 is small and light-weight, there is an advantage of having a high degree of freedom in the vehicle layout.

The first motor 112, for example, is a three-phase AC electric motor. The first motor 112 has a rotor connected to an output shaft (for example, a crank shaft) of the engine 110 and generates electric power using power output by the engine 110. A combination of the engine 110 and the first motor 112 is one example of a power generating unit 113.

The second motor 118, for example, is a running electric motor that rotates the driving wheels 125. The second motor 118 is a three-phase AC electric motor. The second motor 118 executes driving of the vehicle and regeneration. A rotor of the second motor 118 is connected to the driving wheels 125. The second motor 118 outputs power to the driving wheels 125 using supplied electric power. The second motor 118 generates electric power using kinetic energy of the vehicle 100 when the vehicle 100 decelerates. Hereinafter, a power generating operation using the second motor 118 may be referred to as regeneration.

The PCU 130, for example, includes a first converter 132, a second converter 138, and a voltage control unit (VCU) 140. The configuration in which such constituent elements are grouped as a dingle unit as the PCU 130 is merely one example, and such constituent elements may be disposed in a distributed manner.

The first converter 132 and the second converter 138, for example, are AC-to-DC converters. DC-side terminals of the first converter 132 and the second converter 138 are connected to a DC link DL. A battery 150 is connected to the DC link DL through a VCU 140. The first converter 132 converts AC generated by the first motor 112 into a DC and outputs the DC to the DC link DL or converts a DC supplied through the DC link DL into an AC and supplies the AC to the first motor 112. Similarly, the second converter 138 converts AC generated by the second motor 118 into a DC and outputs the DC to the DC link DL or converts a DC supplied through the DC link DL into an AC and supplies the AC to the second motor 118.

The VCU 140, for example, is a DC-to-DC converter. The VCU 140 boosts electric power supplied from the battery 150 and outputs the boosted electric power to the DC link DL.

The battery 150, for example, is a secondary battery such as a lithium ion battery. The battery 150 stores electric power supplied from a charging facility installed at the charging spot 200. The battery 150, for example, stores electric power generated by the power generating unit 113. The battery 150 may store regenerated electric power that is regenerated by the second motor 118.

A charging connector 154 is a connector configured to be detachably connected to a charging plug of a charging facility in order to acquire electric power supplied from the charging facility installed at the charging spot 200. For example, the battery 150 is charged in a state in which the charging connector 154 and the charging plug are connected. The vehicle 100 may include a power receiving unit that wirelessly receives electric power instead of the charging connector 154. In such a case, by stopping the vehicle 100 at a position at which the power receiving unit can receive electric power from a power transmitting unit disposed at the charging spot 200 in a non-contact manner, the battery 150 is wirelessly charged.

The power control unit 160, for example, includes a hybrid control unit 161, an engine control unit 162, a motor control unit 163, a brake control unit 164, and a battery control unit 165. The hybrid control unit 161 outputs instructions to the engine control unit 162, the motor control unit 163, the brake control unit 164, and the battery control unit 165. The instructions made by the hybrid control unit 161 will be described later.

The engine control unit 162 executes ignition control of the engine 110, control of an opening degree of the throttle, control of fuel injection, control of fuel cutting, and the like in accordance with instructions from the hybrid control unit 161. The engine control unit 162 may calculate an engine speed on the basis of an output of a crank angle sensor mounted in the crank shaft and output the engine speed to the hybrid control unit 161.

The motor control unit 163 performs switching control of the first converter 132 and/or the second converter 138 in accordance with an instruction from the hybrid control unit 161.

The brake control unit 164 controls a brake device not shown in the drawing in accordance with an instruction from the hybrid control unit 161. The brake device is a device that outputs a brake torque corresponding to a driver's braking operation to each vehicle wheel.

The battery control unit 165 calculates an amount of electric power (for example, a state of charge (SOC); charging ratio) of the battery 150 on the basis of an output of a battery sensor 152 mounted in the battery 150 and outputs the amount of electric power to the hybrid control unit 161.

The vehicle sensor 170, for example includes an acceleration opening degree sensor, a vehicle speed sensor, a brake depression amount sensor, and the like. The acceleration opening degree sensor is mounted in an acceleration pedal, which is one example of an operator accepting an acceleration instruction from a driver, detects an amount of operation on the acceleration pedal, and outputs a degree of acceleration opening to the power control unit 160. The vehicle sensor, for example, includes a vehicle wheel speed sensor mounted in each vehicle wheel and a speed calculator, derives a speed of the vehicle (vehicle speed) by integrating vehicle wheel speeds detected by vehicle wheel speed sensors, and outputs the derived result to the power control unit 160. The brake depression amount sensor is mounted in a brake pedal, which is one example of an operator accepting a deceleration instruction or a stop instruction from a driver, detects an amount of operation on the brake pedal, and outputs the detected amount of operation to the power control unit 160 as an amount of brake depression.

The communication device 175 communicates with other vehicles present in the vicinity of the subject vehicle M, for example, using a cellular network, a Wi-Fi network, Bluetooth (registered trademark), dedicated short range communication (DSRC), or the like or communicates with the vehicle supporting server 300 through a radio base station.

The navigation device 180, for example, includes a global navigation satellite system (GNSS) receiver 181, a navigation HMI 182, and a route determining unit 183 and stores map information 184 in a storage device such as a hard disk drive (HDD) or a flash memory. The GNSS receiver 181 identifies a position of the subject vehicle M on the basis of signals received from GNSS satellites. The position of the subject vehicle M may be identified or supplemented using an inertial navigation system (INS) using an output of the vehicle sensor 170. The navigation HMI 182 includes a display device, a speaker, a touch panel, a key, and the like. The route determining unit 183, for example, determines a route (hereinafter, referred to as a route on the map) from a position of the subject vehicle M identified by the GNSS receiver 181 or an input arbitrary position (hereinafter, referred to as a place of departure) to a destination input by the vehicle occupant using the navigation HMI 182 by referring to the map information 184. The route determining unit 183 may generate a running plan including a scheduled time at which the subject vehicle will run on each road included in a route and the like. The running plan is a plan in which a time at which a user desires to arrive at a destination, traffic congestion information of roads, a route in which a user desires to pass, a type of road on which a user desires to pass, and the like are taken into account. The running plan, for example, is displayed on the navigation HMI 182. A vehicle occupant executes control of the subject vehicle M such that the subject vehicle arrives at the destination at a desired arrival time in accordance with the running plan displayed on the navigation HMI 182. The subject vehicle M according to this embodiment may be an automatic driving vehicle that automatically controls steering and acceleration/deceleration of the subject vehicle M on the basis of the running plan and the surrounding situations of the vehicle M. The route on the map and the running plan determined by the route determining unit 183 are output to the plan control unit 190. The map information 184, for example, is information in which road shapes are represented using links representing roads and nodes connected using the links. The map information 184 may include a curvature of each road, point of interest (POI) information, and the like. In the map information 184, positional information of the charging spot 200 and a charging spot identification ID that is identification information of the charging spot 200 are included.

Here, control using the hybrid control unit 161 will be described. The hybrid control unit 161, first, derives a driving shaft required torque Td on the basis of the degree of acceleration opening and a target vehicle speed and determines a driving shaft required power Pd output by the second motor 118 on the basis of the derived result. The hybrid control unit 161 determines whether to operate the engine 110 or not on the basis of the determined driving shaft required power Pd, power consumption of an auxiliary machine, the amount of electric power of the battery 150, and the like. Then, in a case in which the engine 110 is determined to be operated, the hybrid control unit 161 determines engine power Pe to be output by the engine 110.

The hybrid control unit 161 determines a reaction torque of the first motor 112 in accordance with the determined engine power Pe such that it is balanced with the engine power Pe. The hybrid control unit 161 outputs determined information to the engine control unit 162. In a case in which the brake is operated by a vehicle occupant (driver), the hybrid control unit 161 determines a distribution between a brake torque that can be output through regeneration of the second motor 118 and a brake torque to be output by the brake device and outputs the determined distribution to the motor control unit 163 and the brake control unit 164.

The plan control unit 190 generates a power generation plan for operating the power generating unit 113 on the basis of information acquired from the vehicle supporting server 300 and the like for the subject vehicle M running along a route from the place of departure to the destination. Details of the function of the plan control unit 190 will be described later.

[Charging Spot]

Referring back to FIG. 1, the charging spot 200, for example, includes a charging spot managing device 210. The charging spot managing device 210 communicates with the vehicle supporting server 300 through the network NW. For example, in a case in which there is an inquiry from the vehicle supporting server 300 or in a case in which a predetermined time has elapsed after previous transmission, the charging spot managing device 210 transmits an operation status of the charging spot 200 that is a management target to the vehicle supporting server 300. The operation status, for example, is an operation rate. The operation rate, for example, represents a proportion of an operation time per predetermined time. In the operation status, information indicating whether or not a charging spot is out of order may be included. In the operation status, a charging ratio of the vehicle 100 using the charging spot 200 and a predicted time until charging is completed may be included.

[Vehicle Supporting Server]

The vehicle supporting server 300, for example, includes a communication unit 310, a charging spot status acquiring unit 320, an inquiry information acquiring unit 330, a use status predicting unit 340, an information providing unit 350, and a storage unit 360. The charging spot status acquiring unit 320, the inquiry information acquiring unit 330, the use status predicting unit 340, and the information providing unit 350, for example, are realized by a hardware processor such as a central processing unit (CPU) executing a program (software). Some or all of such constituent elements may be realized by hardware (a circuit; including circuitry) such as a large scale integration (LSI), an application specific integrated circuit (ASIC), a field-programmable gate array (FPGA), or a graphics processing unit (GPU) or may be realized by cooperation between software and hardware.

The storage unit 360 is realized by a hard disk drive (HDD), a flash memory, a random access memory (RAM), a read only memory (ROM), and the like. In the storage unit 360, for example, map information 362, a use status table 364, congestion information 366, weather information 368, and other information are stored. In the map information 362, for example, road information of each road represented by nodes and links, traffic regulation information, address information (an address and a postal code), facility information, and the like are included. In the road information, a road ID that is identification information of a road, information representing a type of road such as an expressway, a toll road, a national road, or a prefectural road and information such as the number of lanes of a road, an area of an emergency parking zone, a width of each lane, a gradient of a road, the position of a road (three-dimensional coordinates including longitude, latitude, and a height), a curvature of the curve of a lane, locations of merging and branching points of lanes, signs installed on a road, and the like are included. In the map information 362, information of a position at which the charging spot 200 is installed may be included. In the map information 362, information relating to a region ID that is identification information of a region may be included. By accessing another device using the communication unit 310, the map information 362 may be updated at any time.

The communication unit 310, for example, is a network card used for a connection with the network NW. The communication unit 310 communicates with the vehicle 100 or the charging spot managing device 210 through the network NW.

The charging spot status acquiring unit 320 acquires a status of each of a plurality of charging spots 200 managed by the vehicle supporting server 300. More specifically, the charging spot status acquiring unit 320 inquires the charging spot managing device 210 monitoring each of the charging spots 200 of an operation status for every predetermined time and acquires the operation status at that time point. The charging spot status acquiring unit 320 stores the acquired information in the storage unit 360 in association with a charging spot identification ID that is identification information of the charging spot 200 and date and time information as the use status table 364.

FIG. 3 is a diagram showing one example of a content of the use status table 364. The use status table 364 is information in which an installation position, date and time information, an operation rate, the number of reserved vehicles, and a malfunction flag are associated with each charging spot identification ID. The date and time information is date and time information on which the use status of the charging spot 200 was acquired. The number of reserved vehicles represents the number of vehicles 100 for which charging was reserved at the charging spot 200 at a time point at which the use status of the charging spot 200 was acquired. For example, a reservation for charging at the charging spot 200 is performed by operating the navigation device 180 or operating a terminal device (for example, a smartphone or the like) held by a vehicle occupant. The malfunction flag represents whether or not the charging spot 200 is out of order. In the example shown in FIG. 3, in a case in which the malfunction flag is "1", it represents that the charging spot is out of order, and, in a case in which the malfunction flag is "0", it represents that the charging spot is not out of order. In the use status table 364, a charging rate of the vehicle 100 using the charging spot 200 and a predicted time until charging will be completed may be included.

The inquiry information acquiring unit 330 acquires inquiry information relating to the use status of the charging spot 200 from the vehicle 100.

The use status predicting unit 340 collates an identification ID of the charging spot 200 acquired by the inquiry information acquiring unit 330 with a charging spot identification ID included in the use status table 364 and acquires information relating to the charging spot 200 corresponding to the matched identification IDs. Then, the use status predicting unit 340 predicts a future use status of the charging spot 200 on the basis of the acquired information. For example, the use status predicting unit 340 predicts an operation rate and the number of reserved vehicles for every predetermined time on the basis of the date and time information from which the operation rate and the number of reserved vehicles are acquired. For example, in a case in which there is no reservation for the use of the charging spot 200, the use status predicting unit 340 predicts an end time at which the charging of the vehicle 100 ends on the basis of information representing the charging rate and the predicted time of the vehicle 100 using the charging facility acquired from the charging spot 200 and predicts that the charging facility will be in a usable state after the predicted end time. The use status predicting unit 340 transmits the predicted result and the information acquired from the use status table 364 to the vehicle 100 that has made the inquiry.

In a case in which information relating to a place of departure and a destination is acquired from the vehicle 100 by the inquiry information acquiring unit 330, the use status predicting unit 340 may acquire a route from the place of departure to the destination by collating the information relating to the place of departure and the destination with the map information 362 and acquire the charging spot 200 included in an area identified on the basis of a route from the place of departure to the destination. In such a case, the use status predicting unit 340 may collate the acquired identification information of the charging spot 200 and the charging spot identification ID of the use status table 364 and acquire the use status of the charging spot 200. Then, the use status predicting unit 340 predicts the operation rate and the number of reserved vehicles of the charging spot 200 when the vehicle 100 that has made the inquiry arrives at the charging spot 200 on the basis of the acquired use status and the route from the place of departure to the destination.

Figures 4, 5, 6:
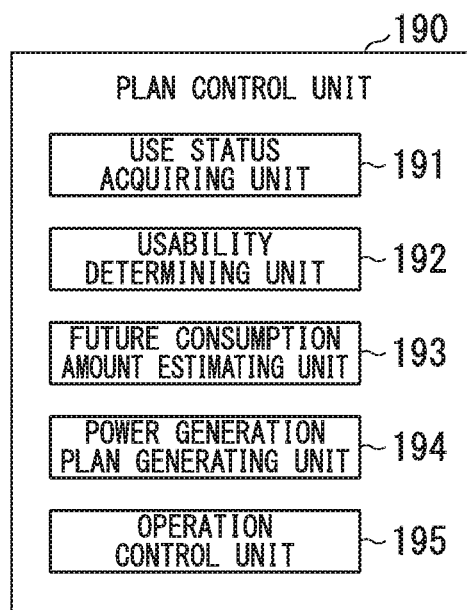
FIG. 4 is a diagram showing one example of a content of congestion information.
FIG. 5 is a diagram showing one example of a content of weather information.
FIG. 6 is a diagram showing one example of the functional configuration of a plan control unit.

The information providing unit 350, for example, extracts a road ID from the map information 362 on the basis of the route from the place of departure to the destination that has been received from the vehicle 100 and acquires a degree of congestion from the congestion information 366 on the basis of the extracted road ID. FIG. 4 is a diagram showing one example of a content of the congestion information 366. The congestion information 366, for example, is information in which a degree of congestion is associated with a road ID stored in the map information 362. The vehicle supporting server 300, for example, acquires a degree of congestion for each road ID by accessing a server managing the degree of congestion for each road ID at predetermined intervals and stores the acquired degree of congestion in the congestion information 366 in association with the road ID. The information providing unit 350 collates the road ID extracted from the map information 362 with the road ID included in the congestion information 366, acquires a degree of congestion corresponding to the matched road ID, and provides the acquired degree of congestion for the vehicle 100 that has made the inquiry.

The information providing unit 350 may extract a region ID from the map information 362 on the basis of the route from the place of departure to the destination and acquire information relating to weather from the weather information 368 on the basis of the extracted region ID. FIG. 5 is a diagram showing one example of a content of the weather information 368. The weather information 368, for example, is information in which weather is associated with a region ID stored in the map information 362. The vehicle supporting server 300, for example, acquires weather of each region ID by accessing a server managing weather at predetermined time intervals and stores the acquired weather in the weather information 368 in association with the region ID. The information providing unit 350 collates the extracted region ID with the region ID of the weather information 368 acquires weather corresponding to the matched region ID and transmits information of the acquired weather to the vehicle 100 that has made the inquiry.

[Plan Control Unit]

Next, details of the function of the plan control unit 190 will be described. FIG. 6 is a diagram showing one example of the functional configuration of the plan control unit 190. The plan control unit 190, for example, includes a use status acquiring unit 191, a usability determining unit 192, a future consumption amount estimating unit 193, a power generation plan generating unit 194, and an operation control unit 195. Such constituent elements, for example, are realized by a hardware processor such as a central processing unit (CPU) executing a program (software). Some or all of such constituent elements may be realized by hardware (a circuit; including circuitry) such as an LSI, an ASIC, an FPGA, or a GPU or may be realized by cooperation between software and hardware.

The use status acquiring unit 191 acquires the route from the place of departure to the destination determined by the route determining unit 183 and acquires a use status of a charging spot present in an area identified using by the acquired route. For example, the use status acquiring unit 191 acquires at least one charging spot 200 present in an area within a predetermined distance (for example, within 300 [m]) from the route from the place of departure to the destination by referring to the map information 184 on the basis of the route from the place of departure to the destination. The use status acquiring unit 191 may acquire a charging spot 200 present within a predetermined distance from the destination or a charging spot 200 present at the destination instead of the route. The use status acquiring unit 191 may acquire an installation position of the charging spot 200 as a destination.

In a case in which there is no charging spot 200 within a predetermined distance, the use status acquiring unit 191 may extend the predetermined distance in a stepped manner and acquire at least one charging spot 200.

The use status acquiring unit 191 acquires an identification ID of the acquired charging spot 200 from the map information 184 and transmits the acquired identification ID to the vehicle supporting server 300 through the communication device 175. The use status acquiring unit 191 may transmit information relating to the place of departure and the destination to the vehicle supporting server 300 instead of (or in addition to) the identification ID. Then, the use status acquiring unit 191 acquires the use status of the charging spot 200 corresponding to the identification ID from the vehicle supporting server 300. The use status includes, for example, information relating to an operation rate or the number of reserved vehicles at a time at which the subject vehicle M is predicted to arrive at the charging spot 200. The use status includes information relating to a state such as a state in which the charging spot 200 is out of order. The use status may be information representing whether or not the subject vehicle M can use the charging spot 200 at a predetermined time (for example, before/after a time at which the subject vehicle M is predicted to arrive at the charging spot 200).

The usability determining unit 192 determines whether or not at least one charging spot 200 is in a predetermined status in the route from the place of departure to the destination of the subject vehicle M on the basis of the use status acquired by the use status acquiring unit 191. Here, the predetermined status, for example, is a status in which the charging spot 200 cannot be used. The predetermined status is a status in which the battery 150 cannot be charged using the charging spot 200. The status in which the charging spot 200 cannot be used (or the status in which the battery 150 cannot be charged using the charging spot 200), for example, is a status in which a waiting time that is necessary for the use of the charging spot 200 at the time of arrival at the charging spot 200 is not within a predetermined time or a status in which the waiting time is estimated not to be within a predetermined time with a high possibility. For example, for a certain charging spot 200, the usability determining unit 192 estimates a predicted time at which the subject vehicle M will arrive at the charging spot 200, and, in a case in which the operation rate of the charging spot 200 is equal to or higher than a predetermined value or in a case in which the number of reserved vehicles is equal to or greater than a predetermined number, the usability determining unit 192 determines that the subject vehicle cannot be charged using the charging spot 200. In a case in which a state in which the charging spot 200 is out of order is acquired, the usability determining unit 192 determines that the charging spot 200 cannot be used.

The future consumption amount estimating unit 193 estimates an amount of consumption of energy to be consumed in the future by the subject vehicle M (hereinafter, referred to as a future consumption amount). For example, the future consumption amount estimating unit 193 estimates a future consumption amount on the basis of a distance of a reciprocation route from the place of departure to the destination, a road gradient, a time frame, a vehicle weight, and the like. For example, the future consumption amount estimating unit 193 estimates that the future consumption amount increases as the running distance increases and estimates that the future consumption amount is larger in a case in which the subject vehicle runs on a road having a gradient than in a case in which the subject vehicle runs on a flat road. The future consumption amount estimating unit 193 estimates that the future consumption amount will be larger in a case in which the running time frame is night due to turning-on of light than in a case in which the running time frame is day. The future consumption amount estimating unit 193 estimates that a future consumption amount will be larger as the vehicle weight of the subject vehicle M further increases.

In addition to the information described above, the future consumption amount estimating unit 193 may inquire the vehicle supporting server 300 of the degree of congestion, the weather, or the like of the route from the place of departure to the destination and estimate the future consumption amount on the basis of the degree of congestion, the weather, or the like acquired from the vehicle supporting server 300. For example, as the degree of congestion of the route further becomes higher, the navigation device 180, the other in-vehicle devices, and the like are operated for a longer time, and accordingly, the future consumption amount estimating unit 193 increases the future consumption amount. The future consumption amount estimating unit 193 increases the future consumption amount in a case in which the weather is cloudy or rain due to operations of a wiper and the like of the subject vehicle M as compared with a case in which the weather is sunny or cloud. The future consumption amount estimating unit 193 may re-estimate the future consumption amount every time when a predetermined time elapses after the first estimation of the future consumption amount or every time when the subject vehicle M runs a predetermined distance.

The power generation plan generating unit 194 generates a power generation plan for operating the power generating unit 113 on the basis of the future consumption amount estimated by the future consumption amount estimating unit 193. Here, the power generation plan is, for example, a plan in which a timing for operating the power generating unit 113, the amount of power generation per unit time output by the power generating unit 113 are defined and is a plan for using electric power generated by the power generating unit 113 for charging the battery 150 or a plan for supplying the electric power to the second motor 118.

For example, the power generation plan generating unit 194 generates a power generation plan for operating the power generating unit 113 by setting a charging target value of the battery 150 at the time of arrival of the subject vehicle M at the destination is set to be higher in a case in which a status is determined in which all the charging spots 200 acquired by the use status acquiring unit 191 are unusable than in a case in which a status is determined in which the charging spot 200 is usable. Here, the charging target value, for example, is a target value of the charging rate (SOC) of the battery 150. In a case in which a status is determined in which all the charging spots 200 are unusable, the power generation plan generating unit 194 may highly set the charging target value such that the charging rate of the battery 150 in a return path from the destination to the place of departure is not equal to or less than a predetermined value. In this way, for example, vehicle occupant's anxiety about power deficiency in the return path from the place of departure to the destination of the subject vehicle M can be reduced.

In a case in which a status is determined in which at least one of one or more charging spots 200 present in an area identified on the basis of the route from the place of departure to the destination is usable, the power generation plan generating unit 194 generates a power generation plan in which charging is performed using the usable charging spot 200. In such a case, the power generation plan generating unit 194 generates a power generation plan in which the power generating unit 113 is operated such that the charging target value of the battery 150 is not a predetermined value or less when the subject vehicle arrives at the usable charging spot 200. The power generation plan generating unit 194 may transmit information relating to a time at which the charging spot 200 is to be used and the like to the vehicle supporting server 300 and make a reservation for the charging spot 200 to be used.

The operation control unit 195 controls the operation of the power generating unit 113 on the basis of the power generation plan generated by the power generation plan generating unit 194. For example, the operation control unit 195 sets the operation rate of the power generating unit 113 to be higher in a case in which a status is determined in which all the charging spots 200 present in the area identified on the basis of the route from the place of departure to the destination are not usable than in a case in which a status is determined in which the charging spot 200 is usable. The operation control unit 195 may set the operation rate of the power generating unit 113 in a forward path to be higher than the operation rate in a return path in reciprocation paths between the place of departure and the destination.

Figure 7:
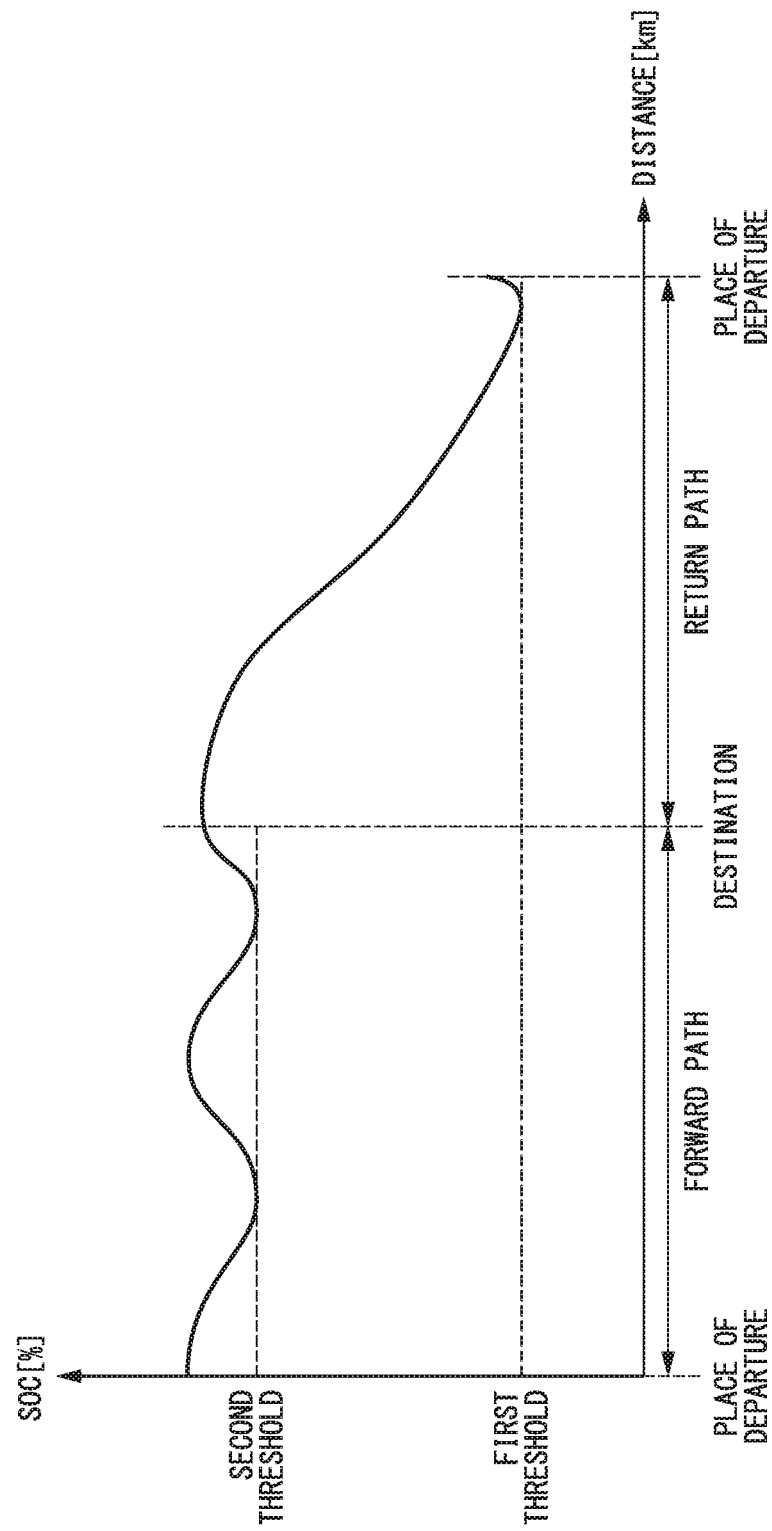
FIG. 7 is a diagram showing a process of an operation control unit.

FIG. 7 is a diagram showing a process of the operation control unit 195. In the example shown in FIG. 7, a process of the operation control unit 195 in a case in which a status is determined in which the charging spot 200 is unusable is shown. In FIG. 7, the horizontal axis represents a reciprocation distance [Km] between a place of departure and a destination, and the vertical axis represents a SOC [%] of the battery 150 of the subject vehicle M. The operation control unit 195 sets a charging rate for each distance on the basis of the distance of the reciprocation path, the road gradient, the time frame, the vehicle weight, the weather, and the degree of congestion described above. The operation control unit 195, for example, operates the power generating unit 113 such that the SOC of the battery 150 in the forward path from the place of departure to the destination in the reciprocation paths between the place of departure and the destination is equal to or higher than a second threshold which is higher than a first threshold that is a charging target value of the SOC of the battery 150 in a case in which a status is determined in which the charging spot 200 is usable. The second threshold, for example, is about 80 [%].

The operation control unit 195, for example, may operate the power generating unit 113 such that the SOC of the battery 150 at the time of arrival of the subject vehicle at the destination is equal to or higher than the second threshold in the reciprocation paths between the place of departure and the destination. In such a case, the future consumption amount estimating unit 193 predicts a future consumption amount in the return path, and the power generation plan generating unit 194 determines the second threshold and the power generation plan on the basis of a result of the prediction. The second threshold, for example, is an SOC corresponding to an amount of electric power acquired by subtracting electric power generated on the basis of the power generation plan and an amount of surplus electric power from the future consumption amount.

The operation control unit 195 operates the power generating unit 113 such that the SOC of the battery 150 in the return path is equal to or higher than the first threshold that is smaller than the second threshold. The first threshold, for example, is about 30 [%]. The first threshold and the second threshold may be fixed values or values that are variably set on the basis of a running distance from the place of departure to the destination or may be arbitrarily set by a vehicle occupant.

For example, as a result of setting the threshold of the SOC of the battery 150 at which the operation of the power generating unit 113 is started in the forward path to be higher than that in the return path, in the example shown in FIG. 7, the power generating unit 113 operates twice in the forward path, and the power generating unit operates once in the return path. For this reason, the operation rate of the power generating unit 113 in the forward path is higher than the operation rate in the return path. In this way, since the SOC in the forward path can be maintained at a higher value than that in the return path from the destination to the place of departure, power deficiency in the return path can be reduced, and occurrence of a stress in the vehicle occupant according to power deficiency can be inhibited.

[Process Flow]

Figure 8:
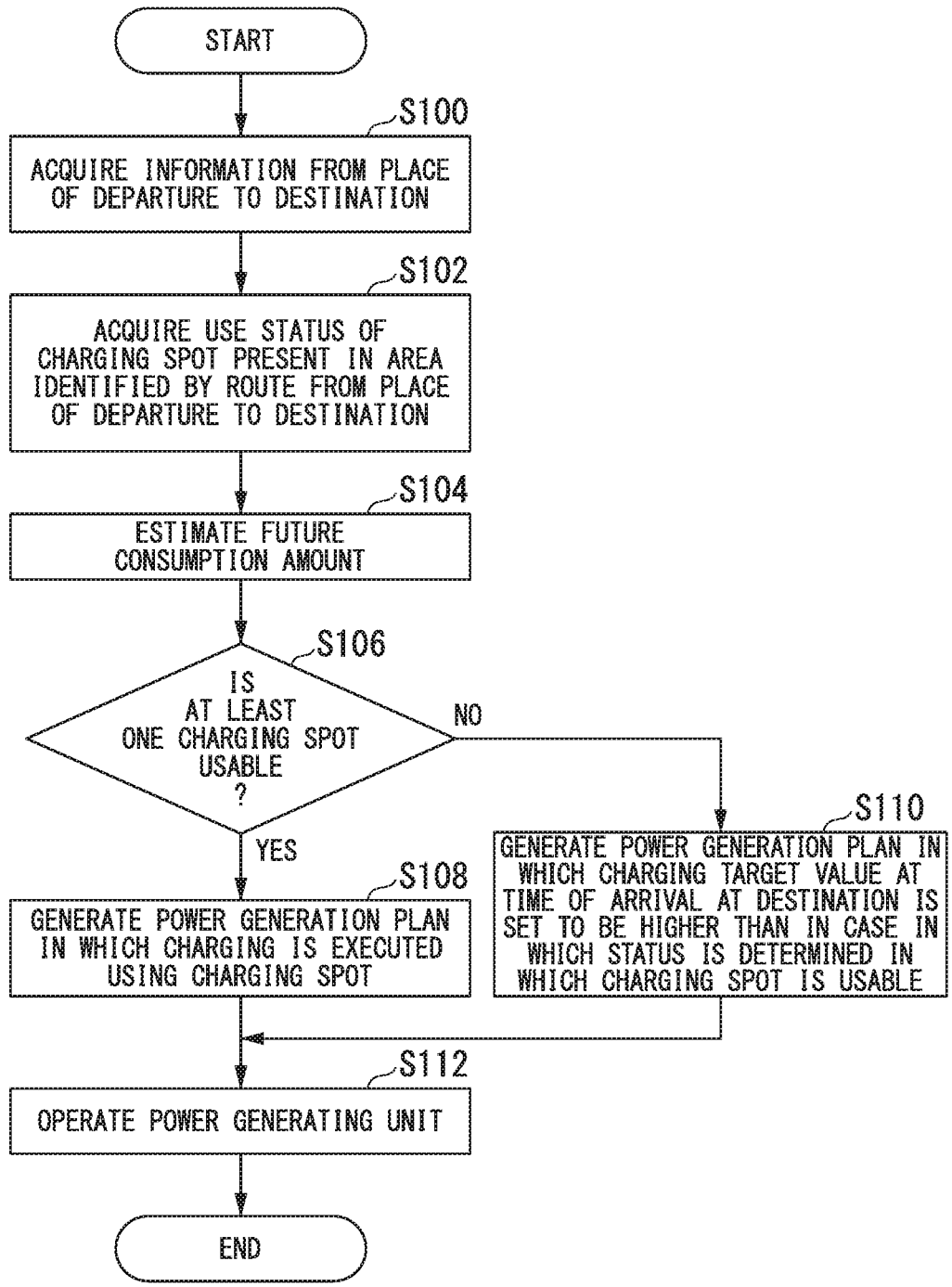
FIG. 8 is a flowchart showing one example of the flow of a process executed by a vehicle system.

FIG. 8 is a flowchart showing one example of the flow of a process executed by the vehicle system 101. In the example shown in FIG. 8, the use status acquiring unit 191 acquires information from a place of departure to a destination from the navigation device 180 (Step S100) and acquires use statuses of charging spots present in an area identified by a route from the place of departure to the destination that has been acquired (Step S102).

Next, the future consumption amount estimating unit 193 estimates an amount of future consumption in reciprocation paths from the place of departure to the destination (Step S104). Next, the power generation plan generating unit 194 determines whether or not a status is formed in which at least one charging spot 200 among all the charging spots 200 from the place of departure to the destination is usable on the basis of the use statuses of the charging spots acquired in Step S102 (Step S106). In a case in which a status is determined in which at least one charging spot 200 is usable, the power generation plan generating unit 194 generates a power generation plan in which the battery 150 is charged using the charging spot 200 (Step S108). In a case in which a status is determined in which all the charging spots are not usable, the power generation plan generating unit 194 generates a power generation plan in which the charging target value of the battery 150 at the time of arrival of the subject vehicle M at the destination is higher than that in a case in which a status is determined in which the charging spot 200 is usable (Step S110). Next, the operation control unit 195 operates the power generating unit 113 on the basis of the generated power generation plan (Step S112). In this way, the process of this flowchart ends.

According to the embodiments described above, in a vehicle control system, by including the power generating unit 113 that includes the engine (an internal combustion engine) 110 outputting power and the first motor (an electric motor) 112 generating electric power using the power output by the engine 110, the battery (a storage battery) 150 that stores electric power generated by the power generating unit 113 or electric power supplied by the charging spot 200, the use status acquiring unit 191 that acquires use statuses of charging spots 200 present in an area identified by a route from the place of departure to the destination of the vehicle, and the power generation plan generating unit 194 that generates a power generation plan in which, in a case in which the use status of the charging spot 200 acquired by the use status acquiring unit 191 is a predetermined status, the power generating unit 113 is aggressively operated in the forward path from the place of departure to the destination more than in the return path from the destination to the place of departure, vehicle occupant's anxiety about power deficiency can be reduced.

According to the embodiments, energy management of a vehicle associated with the use statuses of charging spots can be realized. In the embodiments described above, in reciprocation paths between a place of departure and a destination, in a case in which the charging spot 200 is not usable, a power generation plan in which the power generating unit 113 is operated in the forward path from the place of departure to the destination in preparation for the return path from the destination to the place of departure is generated. However, instead of this, by assuming a distance that is equal to or longer than twice a distance from the place of departure to the destination as a total running distance, a power generation plan may be generated such that the subject vehicle runs the assumed running distance with vehicle occupant's anxiety about power deficiency reduced. In the embodiments described above, for example, a function relating to a use status prediction using the vehicle supporting server 300 may be provided on the vehicle 100 side, and the functions relating to the usability determining unit 192 and the power generation plan generating unit 194 of the plan control unit 190 may be provided on the vehicle supporting server 300 side. Furthermore, one of the charging spot status acquiring unit 320, the inquiry information acquiring unit 330, and the like may have integrated roles thereof.

[Hardware Configuration]

Figure 9:
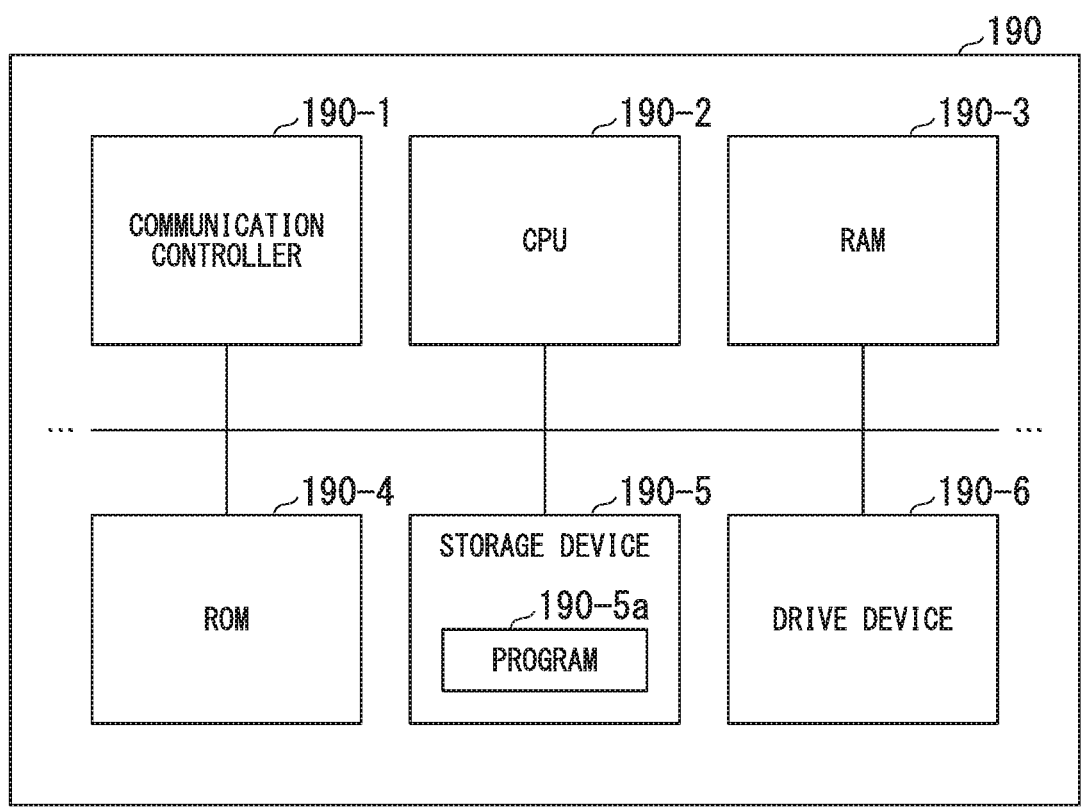
FIG. 9 is a diagram showing one example of the hardware configuration of a plan control unit according to an embodiment.

The plan control unit 190 of the vehicle system 101 according to the embodiment described above, for example, is realized by a hardware configuration as shown in FIG. 9. FIG. 9 is a diagram showing one example of the hardware configuration of the plan control unit 190 according to an embodiment.

The plan control unit 190 has a configuration in which a communication controller 190-1, a CPU 190-2, a RAM 190-3, a ROM 190-4, a storage device 190-5 such as a flash memory or an HDD, and a drive device 190-6 are interconnected through an internal bus or a dedicated communication line. In the drive device 190-6, a portable storage medium (for example, a computer-readable non-transitory storage medium) such as an optical disc is loaded. A program 190-5a stored in the storage device 190-5 is expanded into the RAM 190-3 using a DMA controller (not shown in the drawing) or the like and is executed by the CPU 190-2, whereby the functional units of the plan control unit 190 are realized. The program referred to by the CPU 190-2 may be stored in a portable storage medium loaded in the drive device 190-6 or may be downloaded from another device through a network NW.

The embodiments described above can be represented as below.

A vehicle control system including: a power generating unit that includes an internal combustion engine outputting power used by an electric motor and the electric motor generating electric power using the power output by the internal combustion engine; a storage battery that stores the electric power generated by the power generating unit or electric power supplied by a charging spot; a running electric motor that is connected to driving wheels of a vehicle and is driven using the electric power supplied from the storage battery to rotate the driving wheels; a storage device; and a hardware processor executing the program stored in the storage device, wherein the hardware processor is configured to execute the program described above, whereby a use status of a charging spot present in an area identified by a route from a place of departure to a destination of the vehicle is acquired, and set a charging target value of the storage battery at the time of arrival of the vehicle at a destination to be higher in a case in which a status is determined in which the charging spot is unusable than in a case in which a status is determined in which the charging spot is usable on the basis of the acquired use status of the charging spot.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system using an in-vehicle computer of a vehicle comprising:
   a power generator that includes an internal combustion engine outputting power used by an electric motor and the electric motor generating electric power using the power output by the internal combustion engine, a storage battery that stores the electric power generated by the power generator or electric power supplied by a charging spot, a running electric motor that is connected to driving wheels of the vehicle and is driven using the electric power supplied from the storage battery to rotate the driving wheels, the vehicle control system comprising:
   a processor that executes instructions to:
   acquire a use status of a charging spot present in an area identified by a route from a place of departure to a destination of the vehicle;
   estimate a future consumption amount of the electric power on a round trip route from a starting point to the destination;
   determine a charging target value of the storage battery at a time of arrival of the vehicle at the destination based on the future consumption amount;
   control operation of the power generator based on the charging target value;
   estimate the future consumption amount according to changes in an operating condition of the on-board equipment based on at least one of the following: degree of congestion on the route from the starting point to the destination, weather conditions on the route, or a running time frame of the vehicle;
   estimate the future consumption amount every predetermined time after the first estimation of the future consumption amount or every time the vehicle travels a predetermined distance;
   control the charging target value to be equal to or higher than a second threshold, which is higher than a first threshold, when the charging spot is determined to be unusable, based on the use status of the charging spot; and
   control the charging target value on a return path from the destination to the place of departure to be greater than or equal to the first threshold, so that the operating rate of the power generator on a forward path from the place of departure to the destination is higher than the operating rate on the return path,
   wherein the first threshold is a target charging value when the charging spot is determined to be usable, and the second threshold is a value corresponding to an amount of electricity generated by the power generator and an amount of surplus electricity subtracted, from the future consumption amount.

2. A vehicle control method using an in-vehicle computer of a vehicle including a power generator that includes an internal combustion engine outputting power used by an electric motor and the electric motor generating electric power using the power output by the internal combustion engine, a storage battery that stores the electric power generated by the power generator or electric power supplied by a charging spot, and a running electric motor that is connected to driving wheels of the vehicle and is driven using the electric power supplied from the storage battery to rotate the driving wheels, the vehicle control method comprising:
   acquiring a use status of a charging spot present in an area identified by a route from a place of departure to a destination of the vehicle;
   estimating a future consumption amount of the electric power on a round trip route from a starting point to the destination;
   determining a charging target value of the storage battery at a time of arrival of the vehicle at the destination based on the future consumption amount;
   controlling operation of the power generator based on the charging target value;
   estimating the future consumption amount according to changes in an operating condition of the on-board equipment based on at least one of the following: degree of congestion on the route from the starting point to the destination, weather conditions on the route, or a running time frame of the vehicle;

estimating the future consumption amount every predetermined time after the first estimation of the future consumption amount or every time the vehicle travels a predetermined distance;

controlling the charging target value to be equal to or higher than a second threshold, which is higher than a first threshold, when the charging spot is determined to be unusable, based on the use status of the charging spot; and controlling the charging target value on a return path from the destination to the place of departure to be greater than or equal to the first threshold, so that the operating rate of the power generator on a forward path from the place of departure to the destination is higher than the operating rate on the return path, wherein the first threshold is a target charging value when the charging spot is determined to be usable, and the second threshold is a value corresponding to an amount of electricity generated by the power generator and an amount of surplus electricity subtracted, from the future consumption amount.

3. A computer-readable non-transitory storage medium having a program stored thereon, the program causing an in-vehicle computer of a vehicle including a power generator unit that includes an internal combustion engine outputting power used by an electric motor and the electric motor generating electric power using the power output by the internal combustion engine, a storage battery that stores the electric power generated by the power generator or electric power supplied by a charging spot, and a running electric motor that is connected to driving wheels of the vehicle and is driven using the electric power supplied from the storage battery to rotate the driving wheels to execute:

acquiring a use status of a charging spot present in an area identified by a route from a place of departure to a destination of the vehicle;

estimating a future consumption amount of the electric power on a round trip route from a starting point to the destination;

determining a charging target value of the storage battery at a time of arrival of the vehicle at the destination based on the future consumption amount;

controlling operation of the power generator based on the charging target value;

estimating the future consumption amount according to changes in an operating condition of the on-board equipment based on at least one of the following: degree of congestion on the route from the starting point to the destination, weather conditions on the route, or a running time frame of the vehicle;

estimating the future consumption amount every predetermined time after the first estimation of the future consumption amount or every time the vehicle travels a predetermined distance;

controlling the charging target value to be equal to or higher than a second threshold, which is higher than a first threshold, when the charging spot is determined to be unusable, based on the use status of the charging spot; and controlling the charging target value on a return path from the destination to the place of departure to be greater than or equal to the first threshold, so that the operating rate of the power generator on a forward path from the place of departure to the destination is higher than the operating rate on the return path, wherein the first threshold is a target charging value when the charging spot is determined to be usable, and the second threshold is a value corresponding to an amount of electricity generated by the power generator and an amount of surplus electricity subtracted, from the future consumption amount.

4. The vehicle control system according to claim 1, wherein the use status of the charging spot includes at least one of the following: a number of reserved charging spots and information about malfunction.

5. The vehicle control system according to claim 1, the processor further executes instructions to:

send information including the time of use of the charging spot to be used by the vehicle to a server that manages the use status of the charging spot, and reserve the charging spot for use by the vehicle.

* * * * *